United States Patent [19]
Sears

[11] 3,913,088
[45] Oct. 14, 1975

[54] FLIP FLOP CONTROLLED ANNUCIATOR SYSTEM

[76] Inventor: Lawrence Mark Sears, 25555 N. Moreland Blvd., Shaker Heights, Ohio 44120

[22] Filed: Dec. 11, 1974

[21] Appl. No.: 531,806

[52] U.S. Cl. .................................. 340/286; 340/332
[51] Int. Cl.² .......................................... G08B 5/22
[58] Field of Search ........ 340/286 R, 287, 332, 311, 340/312, 313

[56] References Cited

UNITED STATES PATENTS 3,599,200 8/1971 Bunting .......................... 340/332 X

*Primary Examiner*—Harold I. Pitts
*Attorney, Agent, or Firm*—Marvin L. Union

[57] ABSTRACT

An annunciator system includes a plurality of signaling stations and a plurality of switch means. The plurality of switch means are arranged into a plurality of sets of switch means with one switch means of each set being present at each of the plurality of signaling stations. A plurality of indicating means are provided and are arranged into a plurality of sets of indicating means with each set of indicating means corresponding to a set of switch means. One indicating means of each set of indicating means is located at each of the plurality of signaling stations. Flip-flop means is provided for inter-connecting the plurality of switch means of each set with each of the plurality of indicating means in the corresponding set of indicating means. The flip-flop means enables each individual switch means of a set of switch means to actuate or extinguish all of the corresponding set of indicating means. Thus, the operation of the system is such that a signal may be initiated at any of the plurality of signaling stations which will actuate indicating means at all of the plurality of signaling stations and which indicating means may be extinguished at any one of the plurality of signaling stations.

18 Claims, 2 Drawing Figures

FLIP FLOP CONTROLLED ANNUCIATOR SYSTEM

BACKGROUND OF THE INVENTION

The present invention relates to an annunciator system which can be actuated or extinguished at any of the plurality of signaling stations associated therewith. Many different types of annunciator systems are known in the prior art. The problems associated with the known annunciator systems are due to the complex circuitry incorporated therein which increases the manufacturing costs and complicates the installation of such systems. One attempt to overcome the complex systems is disclosed in the Bunting U.S. Pat. No. 3,599,200 entitled Doctor's Register and which discloses a series connected annunciator system which is actuated by controlling the conductivity of a SCR. Such a system suffers from the disadvantages that in series circuitry a relatively high voltage is required due to the IR drop across series components. Moreover, as the number of series components increases the voltage applied thereto must also be increased. For example, if ten station series systems utilized 6 Volt lamps, the voltage required would be 60 Volts, a voltage which is prohibited by code in many jurisdictions for low voltage systems. Also with series circuitry as disclosed in Bunting trouble-shooting is complicated in view of the fact that it is difficult to isolate the problem due to the series circuitry and the fact that circuitry is located at each of the Bunting stations. Thus, if one component goes bad tracing the circuitry is complicated. Moreover, known prior art systems, such as Bunting, also suffer from reliability due to the low noise immunity of the systems. Specifically, when SCR's are used as the system trigger, the noise immunity of the system is low due to the inherent low noise immunity of the SCR. By decreasing the complexity of the system the reliability is decreased due to the fact that extraneous noise signals often actuate the circuitry with the result being false signals.

SUMMARY OF THE INVENTION

The present invention relates to an annunciator system which can be actuated and extinguished by flip-flop action at any of a plurality of signaling stations and which overcomes the disadvantages associated with the prior art as set forth hereinabove.

Another provision of the present invention is to provide an annunciator system including a plurality of signaling stations, a plurality of first switch means one of which is located at each of the plurality of signaling stations and each of which is operable to initiate and terminate a first signal at any one of the plurality of signaling stations and a plurality of first indicating means one of which is located at each of the plurality of signaling stations for indicating the establishment of the first signal at each of the plurality of signaling stations. A plurality of second switch means is also provided, one of which is located at each of the plurality of signaling stations and each of which is operable to initiate and terminate a second signal at any of the plurality of signaling stations. The annunciator system further includes a plurality of second indicating means, one of which is located at each of the plurality of signaling stations, and each of which is responsive to the establishment of the second signal to indicate establishment of the second signal at each of the plurality of signaling stations. A first flip-flop means interconnects the plurality of first switch means and the plurality of first indicating means and a second flip-flop means interconnects the plurality of second switch means and the plurality of second indicating means. The first and second flip-flop means enables the associated signals to be initiated and terminated at each of the plurality of signaling stations by any of the corresponding switch means and to be indicated at all of the plurality of signaling stations by the corresponding indicating means.

Another provision of the present invention is to provide an annunciator system as set forth in the next preceeding paragraph which includes a tone generator for establishing an audio output signal. The tone generator is operable to be connected to a speaker system to establish an audio output through the speaker system in response to the initiation of the first or second signals. A third switch means, for initiating a third signal along with a frequency shifting means responsive to the third signal is provided. The frequency shifting means interconnects the third switch means and the tone generator for altering the audio output of the tone generator in response to the establishment of the third signal.

Still another provision of the present invention is to provide an annunciator system including a plurality of stations each having a plurality of distinct signaling units with each of the signaling units including signal means and control switch means. Means are provided for interconnecting the signaling means of corresponding units to provide for the substantially simultaneous actuation or deactuation of the corresponding signal means at each of the plurality of stations. Flip-flop means is also provided to interconnect the switch means of corresponding units. The flip-flop means includes an output operatively associated with the means interconnecting the signal means for effecting actuation or deactuation of the corresponding signal means. Each of the corresponding switch means is operable to control the output of the flip-flop means to provide for actuation or deactuation of all of the corresponding signal means by each of the corresponding switch means.

DESCRIPTION OF A PREFERRED EMBODIMENT

Figures 1, 2:
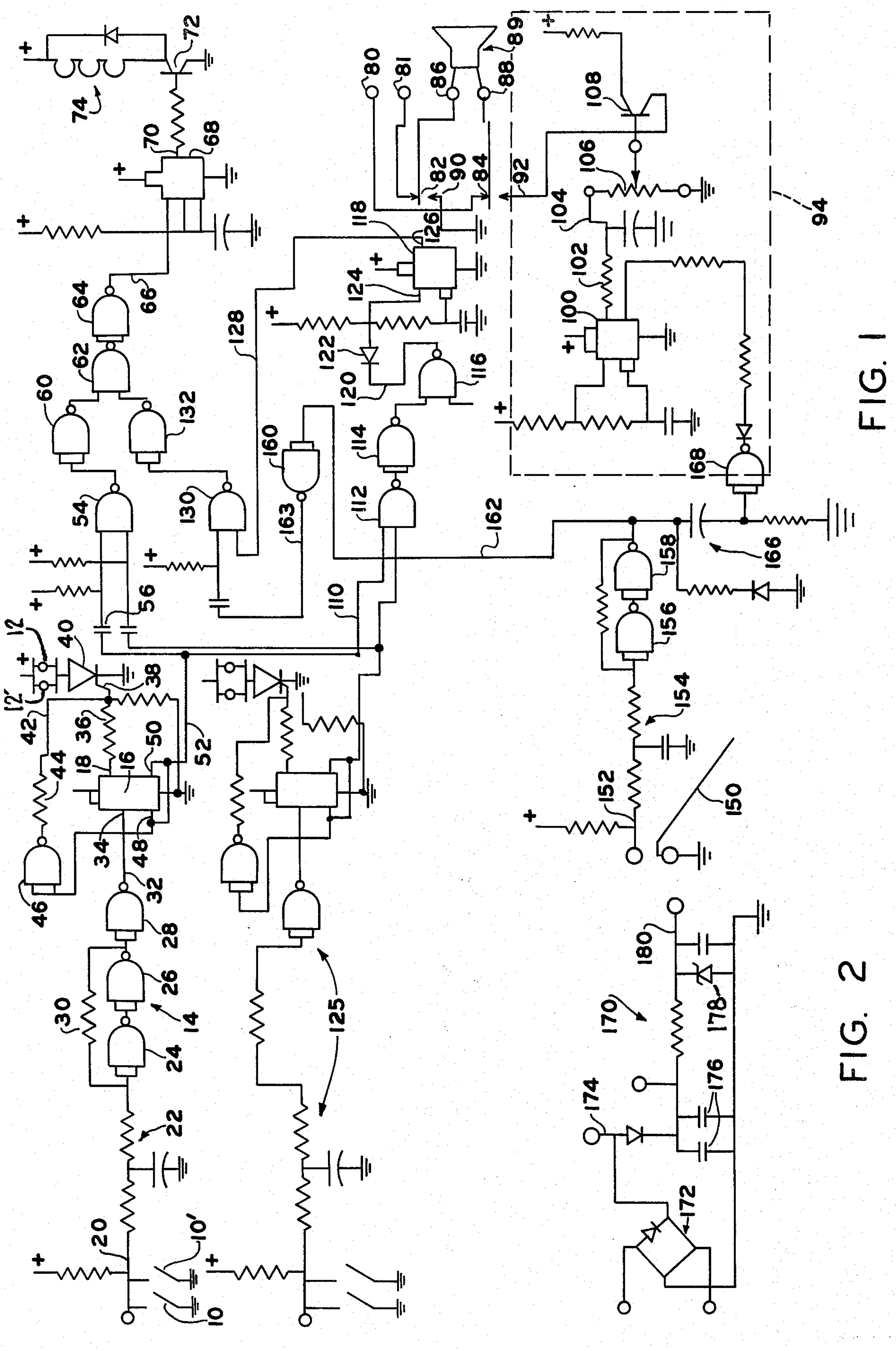
FIG. 1 is a schematic diagram of the annunciator system of the present invention.
FIG. 2 is a schematic diagram of the power supply operable to be connected to the annunciator system.

The present invention provides an annunciator system having a plurality of switch means and a plurality of indicating means located at each of a plurality of indicating stations. To this end FIG. 1 shows a plurality of switch means 10, 10', one of which is located at each of the plurality of signaling stations and all of which are operable to actuate a plurality of indicator lights 12, 12', one of which is located at each of the plurality of signaling stations. The switch means 10 are connected via a logic circuit 14 to a flip-flop 16 whose Q output 18 is operable to actuate the indicator lights 12, 12'. It should be appreciated that the switch means 10 and the indicator light 12 are located at one of the plurality of signaling stations and that the switch means 10' and the indicator light 12' are located at another of the plurality of signaling stations. Preferrably, the switch means 10 and the indicator light 12 form a distinct signaling unit which is located at one of the signaling stations. Likewise, the switch means 10' and the indicator light 12' form another distinct signaling unit located at another of the signaling stations.

The switch means 10, 10' are connected to a line 20 having an RC filter circuit 22 which interconnects the switch means with the input of the logic circuit 14. The RC filter 22 filters the momentary pulse established on line 20 by the closing of one of the switch means 10, 10'. The logic circuit 14 includes NAND gates 24, 26 and 28. The output of the NAND gate 26 is connected via resistor 30 to the input of NAND gate 24 to provide feedback between the NAND gates 24 and 26 to insure a snapping action on the output of NAND gate 26 when a pulse is applied to the input of NAND gate 24. To this end, when one of the switches 10, 10' is momentarily closed a pulse will be applied through the filter circuit 22 to the normally high input of NAND gate 24. The pulse applied to the input of NAND gate 24 will be a negative pulse which will cause the output of NAND gate 24 to go high. The high output of NAND gate 24 will be applied to the input of NAND gate 26 causing the output of NAND gate 26 to go low. The low output of NAND gate 26 will be applied to the inputs of NAND gate 28 to cause a high pulse to be applied on line 32.

Line 32 is connected to the clock input 34 of the flip-flop 16. Normally, the Q output 18 of the flip-flop 16 is low. When it is clocked by the application of a pulse to the clock input 34, the Q output 18 will go high to actuate the indicating lights 12, 12' to indicate the establishment of a signal by one of the switch means 10, 10'.

The Q output 18 of the flip-flop 16 is directed via a resistor 36 to the gate 38 of an SCR 40. The cathode of SCR 40 is connected to ground and the anode is connected in a parallel circuit with the plurality of indicating means 12, 12'. Thus, when a high is applied to the gate 38 of SCR 40, SCR 40 will conduct causing indicating lights 12, 12' to light up thereby indicating the presence of a signal affected by the closing of one of the switch means 10, 10'.

The gate 38 of the SCR 40 is also connected via line 42, a resistor 44, and a NAND gate 46 to the terminal 48 of flip-flop 16. The NAND gate 46 and resistor 44 provide a booster circuit for maintaining a high at gate 38 of the SCR 40 upon the initiation of a signal by one of the switches 10, 10' until subsequent actuation of one of the switches 10, 10' effects extinguishment of the lights 12, 12'. After the lights 12, 12' have been actuated, a subsequent pulse affected by the subsequent closing of one of the switches 10, 10' applies a pulse to the clock input 34 of the flip-flop 16. This pulse clocks flip-flop 16 and causes the Q output 18 to go low to remove the gate signal from SCR 40. This effects extinguishment of the lamps 12, 12' as described more fully below.

In addition to the visual indication of a signal established by the closing of switch 10, 10', the present system also contemplates the establishment of an audio signal on a speaker system 89 by actuation of a relay 74. To this end, energization of relay 74 directs a tone output signal to the speaker system 89 from a tone oscillator 94 in response to closing of one of the switches 10, 10'. The flip-flop 16 includes a $\overline{Q}$ output 50 for effecting energization of the relay 74 to establish a tone output on speaker system 89. The $\overline{Q}$ output 50 is connected via line 52 to the input of a NAND gate 54. A capacitor 56 is connected in line 52 to differentiate the $\overline{Q}$ output before it is applied to the input of NAND gate 54. The $\overline{Q}$ output of flip-flop 16 is normally high. However, when a pulse is applied on the clock input 34 to actuate the indicator lights 12, 12', the $\overline{Q}$ output goes low, thereby applying a low pulse to the input of NAND gate 54. The inputs of NAND gate 54 are normally high and the application of a low thereto causes the output of NAND gate 54 to go high. The high output of NAND gate 54 is directed to the input of NAND gate 60 and effects a low on the output thereof. The output of NAND gate 60 is connected to a NAND gate 62. A low applied to the input of NAND gate 62 causes the output thereof to go high. The output of NAND gate 62 is connected to the input of NAND gate 64 and the high applied to the input of NAND gate 64 causes a low to be established on the line 66.

Line 66 is connected to the input of a single shot 68 which is operable to actuate relay 74 and establish a tone output on the speaker system 89 when one of the switches 10, 10' is initially closed. Single shot 68 is a single shot having a timing circuit incorporated therein. Once the single shot 68 is actuated a output pulse is applied on the output terminal 70 thereof for a duration determined by the timer incorporated therein. Preferably the single shot 68 includes a 0.2 second timer which closes relay 74 for 0.2 seconds every time timer 68 is actuated. When the single shot 68 is actuated by a low pulse being applied along line 66 the output thereof will go high thereby applying a high potential on line 70. Line 70 is connected to the base of transistor 72 to effect conduction thereof. A relay coil 74 is connected in the collector emitter circuit of transistor 72 and conduction of transistor 72 energizes relay coil 74 to effect an audio output on the speaker system 89 as described more fully below.

The present system is adapted to be connected to a sound system. To this end a pair of inputs 80, 81 are provided for directing sound from a sound source through the contacts 82 and 84 of the relay 74 to lines 86 and 88 which are connected to a speaker system 89. When the relay coil 74 is not energized the relay contacts 82 and 84 will be in the position shown in FIG. 1 and sound will be directed from the sound source along lines 80, 81 through the relay contacts 82 and 84 to the output lines 86 and 88 to the speaker system 89.

When the relay coil 74 is energized, the relay contacts will be actuated to disconnect the sound source from the speaker system and connect the speaker system to lines 90 and 92. The line 92 includes a signal thereon from tone generator 94. Thus, when relay coil 74 is energized the sound normally on the speaker system will be disconnected and a tone will be substituted therefor indicative of the presence of a signal at one of the signaling stations.

The tone generator 94 includes an oscillator 100 which is continuously energized and which directs a signal through resistor 102 along line 104 to a potentiometer 106. The potentiometer 106 is connected to the base of transistor 108 and scales the magnitude of the base signal thereto. The collector emitter circuit of transistor 108 is operable to be connected along line 92 to the speaker system. The oscillator 100 establishes a periodic signal which is applied to the base of transistor 108 to cause transistor 108 to periodically conduct. The frequency of oscillator 100 will control the tone established on the speaker system. Thus, it should be appreciated that when relay 74 is energized, oscillator 100 will be connected to the speaker system 89 to establish a tone output indicative of a signal being established by one of the switches 10, 10'.

When the $\overline{Q}$ output of flip-flop 16 goes low the low signal on line 52 will also be applied along line 110 to the input of NAND gate 112 to effect energization of a timer 118 which operates to periodically energize relay 74 to establish a periodic tone output on the speaker system 89 until switches 10, 10' are subsequently actuated to extinguish the signal established thereby. To this end, the inputs of NAND gate 112 are normally high and the application of a low to one of the inputs causes the output of NAND gate 112 to go high. The output of NAND gate 112 is connected through a NAND gate 114 and NAND gate 116 to timer 118. When a low is applied to the normally high inputs of NAND gate 112 the output will go high thereby applying a high to the input of NAND gate 114. This causes the output of NAND gate 114 to apply a low to the input of NAND gate 116 to thereby establish a high on line 120. The high on line 120 back biases diode 122 to apply a high to the input terminal 124 of the timer 118 to thereby energize timer 118.

Timer 118 may preferrably be a five second timer which periodically establishes a low pulse on the output terminal 126 thereof when it is energized. The periodic low signals from the output 126 are directed along line 128 to the input of NAND gate 130. This causes the output of NAND gate 130 to go high every time a pulse is received from the timer 118. The output of NAND gate 130 is directed to the input of a NAND gate 132 whose output is connected to an input of NAND gate 62. The high output of NAND gate 130 causes the output of NAND gate 132 to go low thereby causing a low to be established on the output of NAND gate 64 every time a low pulse is applied to the input of NAND gate 130. Thus, it should be apparent that the 5 second timer 118 effects the establishment of a periodic pulse on the output of NAND gate 64 to periodically actuate the single shot 68. The periodic output of timer 118 thus causes periodic actuation of the single shot 168 and the relay coil 74. Thus, when timer 118 is periodically energized, single shot 68 will be energized for a period established by the timer in single shot 68 to establish a periodic tone on the speaker system 89 until one of the switches 10, 10' is subsequently actuated to clock flip-flop 16 and thus extinguish the output signals from the annunciator system.

A door switch 150 is provided for establishing a distinct signal on the speaker system 89 when the door is opened. Opening of the door switch 150 establishes a high on line 152. The high on line 152 is directed through the filter circuit 154 to the input of NAND gate 156. The high applied to the input of NAND gate 156 causes the output thereof to go low. The output of NAND gate 156 is applied to the input of NAND gate 158 whose output is connected to the input of a NAND gate 160 via line 162. When a high is applied to the input of NAND gate 156 the output of NAND gate 158 goes high. Thus, when the door switch 150 is opened a high will be established on line 162 to thereby establish a low signal at the output of NAND gate 160. The low signal at the output of NAND gate 160 is directed along line 163 to the input of NAND gate 130 to cause the output of NAND gate 130 to go high. The high output of NAND gate 130 effects a low pulse on line 66 at the output of NAND gate 64 to actuate the timer and single shot 68 as described hereinabove. Thus, opening of the door switch 150 effects energization of the relay coil 74 and an output on the speaker system 89 for a period established by the timer incorporated in single shot 68.

Means are associated with the door switch 150 to modify the tone output directed to the speaker system 89 when the door switch 150 is opened. This provides a tone output on the speaker system 89 which is distinct from the tone output established by one of the switches 10, 10' to enable a listener to differentiate between a door opening signal and a signal effected by the closing of switches 10, 10'. To this end, the output of NAND gate 158 is also connected to an RC timer circuit 166 whose output is connected through a NAND gate 168 to an input of the tone oscillator 100. The RC timing circuit 166 operates to change the frequency of the output of oscillator 100 thereby changing the frequency available to be applied to the speaker system 89. Thus, when the door switch 150 is opened a tone will be applied on the speaker system 89 by the closing of the relay coil 74 and which tone will have a frequency which is distinct from the tone which is normally applied to the speaker system 89. This is due to the fact that the RC circuit 166 changes the frequency of the tone oscillator 100 thereby modifying the tone available at the speaker system 89.

A power supply 170 is also provided for energizing the system. To this end, the power supply 170 includes a bridge 172 which rectifies an AC wave form applied thereto. An output of the bridge is connected to the output terminal 174 which provides the lamp common bus with unfiltered DC to energize the lamps 12, 12'. A pair of filter capacitors 176 are also provided in the power supply 170 and are connected across a Zener diode 178 which establishes a 12 volt output on the output terminal 180 thereof for energizing the logic supplies in a well known manner.

It should be realized that since unfiltered DC is utilized with the lamp common, a periodic wave form will be applied through the lamps 12, 12' to the anode of SCR 40. Since a continuous gate is applied to the gate 38 of SCR 40, the SCR 40 will conduct as long as the gate signal is present. However, when the gate signal is removed, the lamps 12, 12' will stay on until the anode of SCR 40 goes negative with regard to the cathode. This is effected by the unfiltered DC which is applied to the lamps. Thus, when the DC decreases in value due to the ripple content thereof the SCR 40 will cease to conduct in the event that a signal is removed from the gate 38 thereof.

It should be appreciated that only one set of switch means 10, 10' and indicator lights 12, 12' has been described and which may be located at each of a plurality of signaling stations. A further set of switch means and lights and the circuitry associated therewith has also been illustrated as 125 although not described in detail. It should be appreciated that the circuitry 125 operates in exactly the same fashion as the circuitry associated with switch means 10, 10' and indicator lights 12, 12'. Moreover, other sets of switch means and lights could also be provided depending on the desired capabilities of the system.

From the foregoing it should be apparent that a new and improved annunciator system has been provided which enables a signal to be established and terminated at any one of a plurality of signaling stations and indicated at all of the plurality of signaling stations. Initial operation of one of the switch means 10, 10' activates indicating lights 12, 12' at all of the signaling stations and establishes a tone output on the speaker system. The lights 12, 12' will remain lit until one of the switches 10, 10' is subsequently actuated to effect extinguishment of all of the indicator lights 12, 12'. Moreover, a tone output on the speaker system will be established upon initial operation of one of the switches 10, 10'. The tone output will become periodic as controlled by the oscillator 118 until subsequent operation of the switches 10, 10' effect extinguishment of the lights 12, 12' and the tone signal. Thus, the present annunciator system provides a system in which signals can be initiated or terminated at any of a plurality of signaling stations and which provides a tone output and a visual indication at all of the plurality of stations until the initial signal is recognized and one of the switches 10, 10' is subsequently operated to effect extinguishment of the signals.

What I claim is:

1. An annunciator system comprising a plurality of signaling stations, a plurality of first switch means one of which is located at each of said plurality of signaling stations and each of which is operable to initiate and terminate a first signal at any of said plurality of signaling stations, a plurality of first indicating means one of which is located at each of said plurality of signaling stations and each of which is operable to indicate the establishment of said first signal, a plurality of second switch means one of which is located at each of said plurality of signaling stations and each of which is operable to initiate and terminate a second signal at any of said plurality of signaling stations, a plurality of second indicating means, one of which is located at each of said plurality of signaling stations, and each of which is operable to indicate the establishment of said second signal, first flip-flop means interconnecting said plurality of first switch means and said plurality of first indicating means to enable said first indicating means to be initiated and terminated at any of said plurality of signaling stations and to be indicated at all of said plurality of signaling stations and second flip-flop means interconnecting said plurality of second switch means and said plurality of second indicating means to enable said second signal to be initiated and terminated at any of said plurality of signaling stations and to be indicated at all of said plurality of signaling stations.

2. An annunciator system as defined in claim 1 wherein said plurality of first and second indicating means includes visual indicating means for visually indicating the presence of said first and second signals.

3. An annunciator system as defined in claim 1 further including a tone generator for establishing an audio output signal, said tone generator being operable to be connected to a speaker system to establish an audio output through the speaker system in response to the initiation of said first or second signals.

4. An annunciator system as defined in claim 3 further including means for connecting said tone generator to the speaker system in response to the establishment of said first or second signals to enable said tone generator to establish an audio output on the speaker system.

5. An annunciator system as defined in claim 3 further including a third switch means for initiating a third signal, frequency shifting means interconnecting said third switch means and said tone generator for altering the audio output of said tone generator in response to the establishment of said third signal.

6. An annunciator system as defined in claim 4 further including third switch means for initiating a third signal, frequency shifting means interconnecting said third switch means and said tone generator for altering the audio output of said tone generator in response to the establishment to said third signal, said means connecting said tone generator to the speaker system being further responsive to said third signal to enable said tone generator to establish an audio output on the speaker system which is distinct from the audio output established by said first or second signals.

7. An annunciator system as defined in claim 4 further including timer means responsive to the establishment of said first or second signals for periodically actuating said means connecting said tone generator to the speaker system to periodically connect the tone generator to the speaker system to establish a periodic audio signal on the speaker system in response to the presence of said first or second signal.

8. An annunciator system as defined in claim 1 wherein said first and second flip-flop means each include an output having first and second states, said outputs of said first and second flip-flops when in said first state effecting actuation of said first indicating means and said second indicating means, respectively, and said outputs of said first and second flip-flops when in said second state effecting termination of a signal indicated by said first indicating means and said second indicating means, respectively.

9. An annunciator system as defined in claim 8 wherein said first and second flip-flop means each include an input, the input of said first and second flip-flop means being operatively associated with said plurality of first switch means and said plurality of second switch means, respectively, to enable each of said plurality of first switch means and each of said plurality of second switch means to effect actuation of said first flip-flop means and said second flip-flop means, respectively.

10. An annunciator system comprising a plurality of stations, each having a plurality of distinct signaling units which are arranged in sets of corresponding units with one of the units of each set being located at each of said plurality of signaling stations, each of said signaling units including electric signal means and control switch means, means interconnecting the signal means of corresponding units to provide for the substantially simultaneous actuation or deactuation of the corresponding signal means at each of said plurality of stations, flip-flop means interconnecting the control switch means of corresponding signaling units, said flip-flop means including a first output operatively associated with said means interconnecting the signaling means for effecting actuation or deactuation of said corresponding signal means, each of said corresponding switch means being operable to control the first output of said flip-flop means to provide for actuation or deactuation of all of the corresponding signal means by each of said corresponding switch means.

11. An annunciator system as defined in claim 10 wherein said corresponding signal means includes a plurality of visual indicating means which are connected in a parallel circuit, said means interconnecting the signal means of corresponding units includes a controlled rectifier connected in said parallel circuit with said corresponding signal means to control the energization thereof, and said first output of said flip-flop means is connected to the gate of said controlled rectifier to control the conductivity of said controlled rectifier and the energization of said corresponding signal means.

12. An annunciator system as defined in claim 11 wherein said flip-flop means further includes a first input connected to said corresponding switch means for enabling each of said corresponding switch means to control said first output of said flip-flop means and the energization of said corresponding signal means.

13. An annunciator system as defined in claim 12 further including audio indicating means for establishing an audio signal in response to energization of one of said switch means.

14. An annunciator system as defined in claim 13 wherein said flip-flop means further includes a second output operatively connected to said audio indicating means and wherein said each of said corresponding switch means is operable to actuate or deactuate said audio indicating means simultaneously with the actuation or deactuation of said corresponding visual indicating means.

15. An annunciator system as defined in claim 14 further including logic circuit means interconnecting said corresponding switch means and said first input of said flip-flop means to establish a distinct signal for actuating said flip-flop means in response to actuation of one of said corresponding switch means.

16. An annunciator system as defined in claim 14 wherein said audio indicating means includes a tone generator operable to be connected to a speaker system to establish an audio output through the speaker system in response to the actuation of one of said switch means.

17. An annunciator system as defined in claim 16 further including additional switch means for initiating an audio signal, frequency shifting means interconnecting said additional switch means and said tone generator to alter the audio output of said tone generator in response to actuation of said additional switch means and establish a tone output on the speaker system which is distinct from the tone output established by the actuation of one of said corresponding switch means.

18. An annunciator system as defined in claim 16 further including timer means operatively associated with said second output of said flip-flop means for effecting periodic connection of said tone generator to the speaker system in response to the actuation of one of said switch means to establish a periodic audio output, said timer means being deactuated in response to deactuation of said actuated switch means to terminate said audio output.

* * * * *